Dec. 26, 1950  M. NEWMAN  2,535,651
HIGH-VOLTAGE METHOD AND SYSTEM
Filed May 12, 1945  7 Sheets-Sheet 1
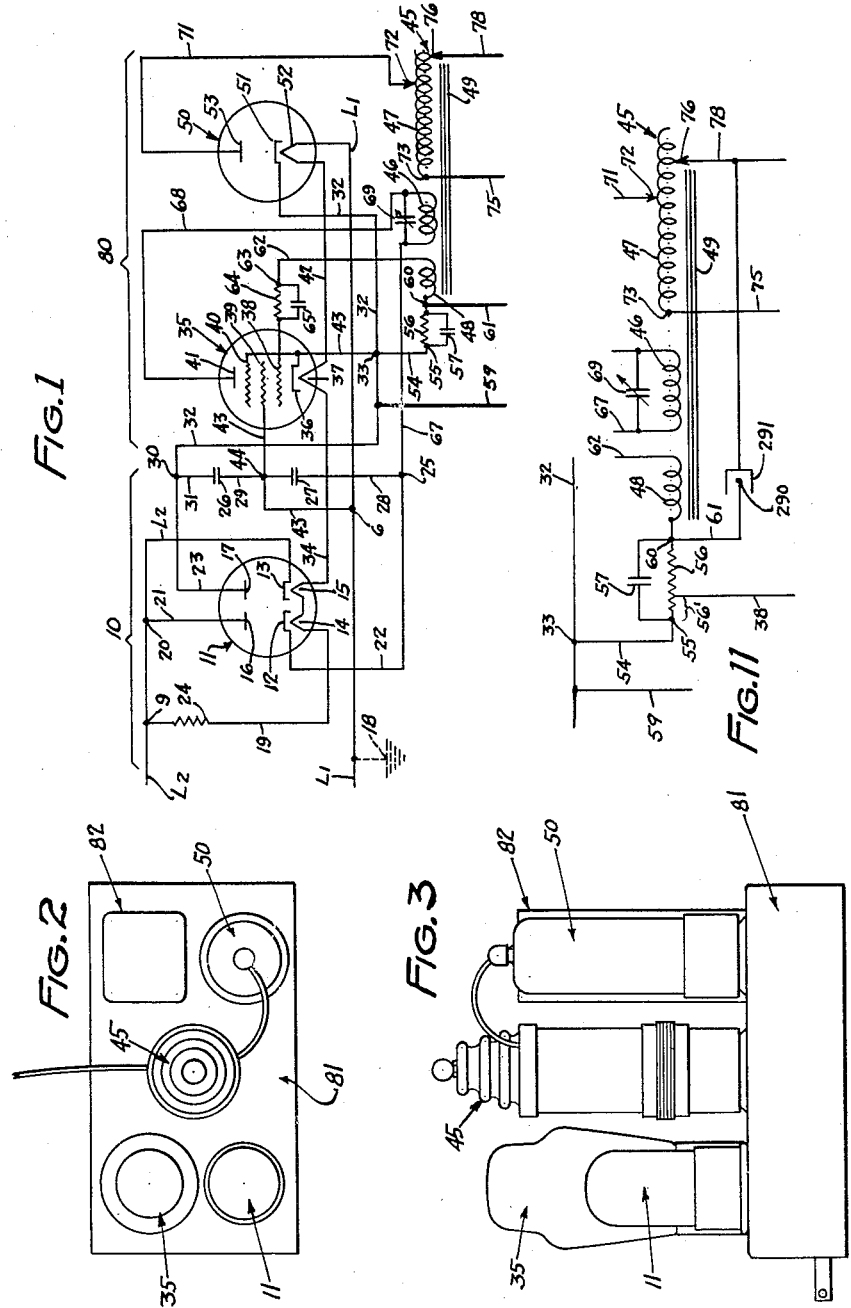
INVENTOR
MORRIS NEWMAN
By Paul, Paul & Moore
ATTORNEYS INVENTOR.
MORRIS NEWMAN
BY Paul, Paul & Moore

ATTORNEYS

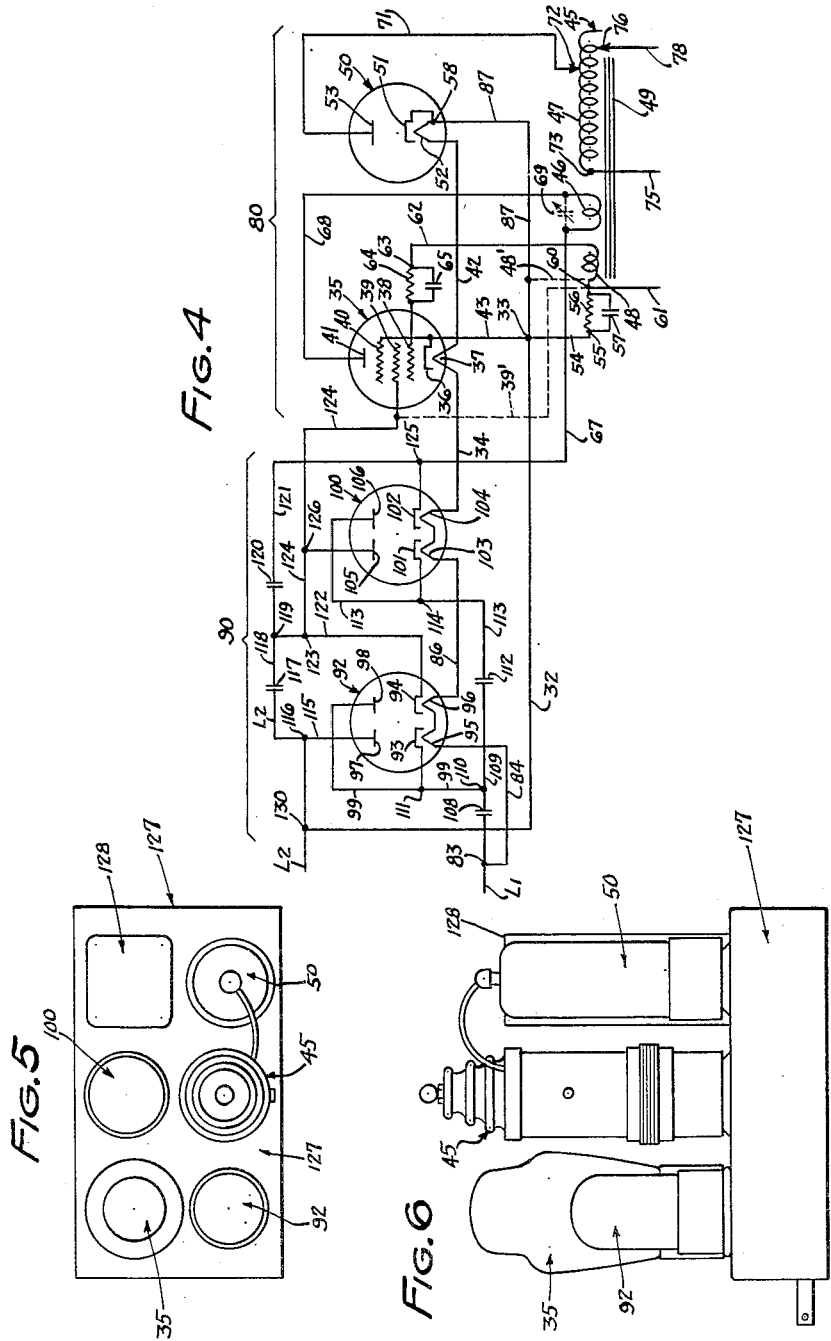

Dec. 26, 1950     M. NEWMAN     2,535,651
HIGH-VOLTAGE METHOD AND SYSTEM

Filed May 12, 1945     7 Sheets—Sheet 4

INVENTOR
MORRIS NEWMAN
By Paul, Paul & Moore
ATTORNEYS

Dec. 26, 1950   M. NEWMAN   2,535,651
HIGH-VOLTAGE METHOD AND SYSTEM
Filed May 12, 1945   7 Sheets-Sheet 5

INVENTOR:
MORRIS NEWMAN.
By Paul, Paul & Moore
ATTORNEYS.

Dec. 26, 1950  M. NEWMAN  2,535,651

HIGH-VOLTAGE METHOD AND SYSTEM

Filed May 12, 1945   7 Sheets-Sheet 6

INVENTOR:
MORRIS NEWMAN
By Paul, Paul & Moore
ATTORNEYS

Dec. 26, 1950          M. NEWMAN          2,535,651
HIGH-VOLTAGE METHOD AND SYSTEM
Filed May 12, 1945          7 Sheets-Sheet 7
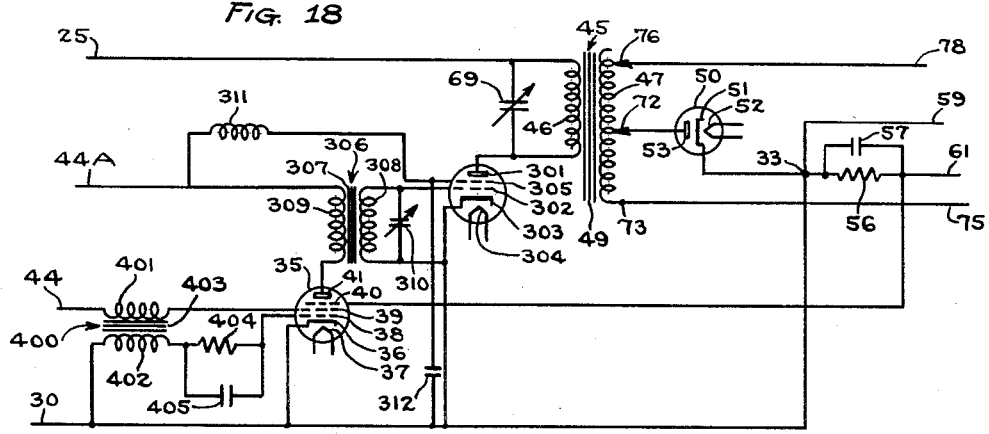
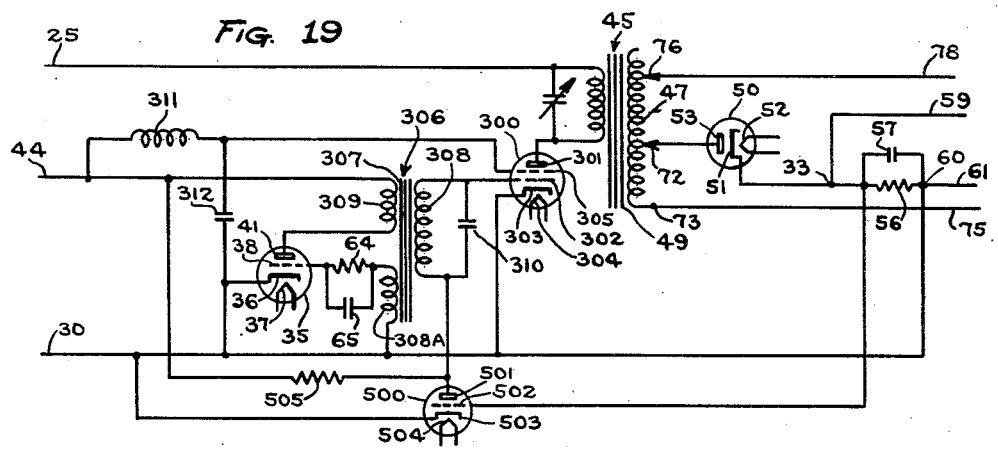
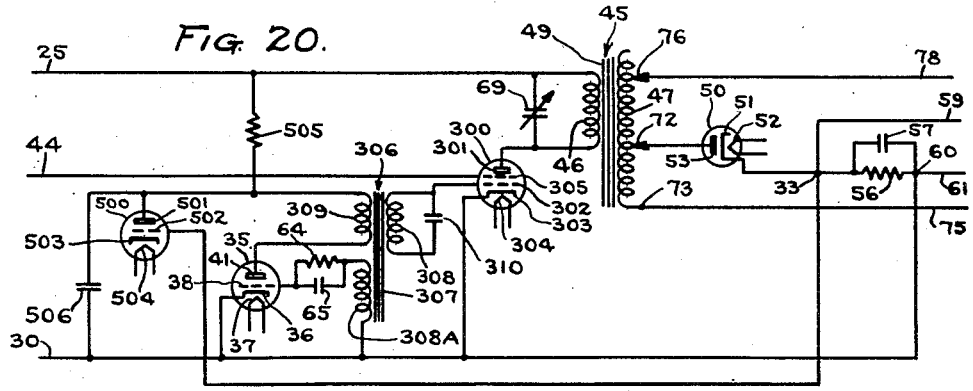
INVENTOR:
MORRIS NEWMAN.
By Paul, Paul & Moore
ATTORNEYS Patented Dec. 26, 1950

2,535,651

UNITED STATES PATENT OFFICE 2,535,651

HIGH-VOLTAGE METHOD AND SYSTEM

Morris Newman, St. Paul, Minn.

Application May 12, 1945, Serial No. 593,516

2 Claims. (Cl. 321—2)

This invention relates to methods and apparatus for providing high voltage unidirectional and high or intermediate frequency power supply for installations wherein the load is relatively small and where voltage control is of importance. Heretofore, it has been customary to provide heavy apparatus for even low wattage installations and to use heavy transformers, rectifiers, filters, and the like.

It is an object of the invention to provide methods and apparatus for supplying high voltage either unidirectional or at a high or intermediate frequency or a combination of the two, and to provide systems and methods wherein close output control is achieved. It is a further object of the invention to provide low weight and low cost apparatus for the foregoing purposes such that the apparatus will be conveniently portable by hand, or where weight is a major consideration, as in aircraft installations.

Other objects are inherent in the apparatus and methods hereinafter illustrated, described and claimed.

The invention is illustrated by the drawing in which:

Figures 1, 1a, 4, 7 and 10 are circuit diagrams of four principal modifications of the invention; Figure 1a corresponds to Figure 1 but shows slight variations in the wiring;

Figures 2 and 3 are, respectively, a plan view and side elevational view of the apparatus, the wiring diagram of which is shown in Figure 1;

Figures 5 and 6 are, respectively, the plan and side elevational views of the apparatus shown in the wiring diagram, Figure 4;

Figure 10 is a modified form of the invention;

Figures 11 and 11a are each a fragmentary part of the wiring diagrams shown in Figures 1, 4, 7 and 10 showing a modified form of voltage control connection; Fig. 11a corresponds to Figure 11 but shows slight variations in the wiring;

Figures 12, 13, 14, 15, 16, 17, 18, 19 and 20 are wiring diagrams of control systems which are alternates to those used in Figures 1, 4, 7 and 10.

Figure 1A:
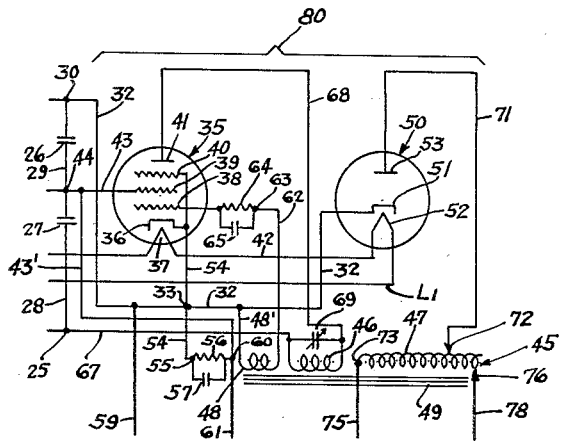

The method of the present invention may be carried out in several forms of apparatus and involves utilizing a low voltage alternating current source of power supply which is transformed or otherwise converted to a somewhat higher direct or alternating current potential which in turn serves as the input of an oscillator tube. The oscillator tube is adjusted to oscillate at any desired frequency in the range from intermediate audio frequencies to intermediate or high radio frequencies. The output of the oscillator tube is applied to the primary of a transformer which is designed to handle the chosen frequency. Thus, for frequencies ranging from the intermediate audio frequencies up to the low radio frequencies, an open or closed core, iron cored transformer, capable of operating efficiently in the frequency range stated, is used; whereas, in the higher radio frequencies an air-core transformer is utilized, providing a high voltage secondary. On the transformer, there is produced a corresponding high voltage output which is utilized directly as the output, or this may be rectified, or the output may be a combination of a high unidirectional voltage with an alternating current component of the oscillator tube frequency.

Figures 1, 2 and 3 illustrate a system in which the apparatus below the bracket 10 serves to convert the relatively low voltage, low frequency alternating current supply to a direct current at a somewhat higher voltage. In this form of the invention, this is accomplished by means of a voltage doubler tube generally designated 11 having a pair of cathodes 12 and 13 which are indirectly heated by series connected heaters 14 and 15. Cathode 12 cooperates with anode 16 and cathode 13 cooperates with anode 17. Alternating current, for example, 110 volts or 220 volts of a commercial frequency, is supplied to feeders $L_1$ and $L_2$. Feeder $L_1$ may be grounded as indicated at 18, if desired. From junction 20 on $L_2$ there extends a branch 21 leading directly to anode 16, $L_2$ being extended and connected directly to cathode 13. From cathode 12, line 22 extends to junction 25 which serves as one of the output terminals of the voltage doubler apparatus 10. From anode 17, line 23 extends to terminal 30 which likewise serves as one of the output terminals of the voltage doubler apparatus 10. A pair of condensers 26 and 27 are connected in series between terminals 25 and 30, by a circuit extending through lines 28, 29 and 31. Junction 44 on line 29 is an intermediate voltage terminal and is connected by line 43 to junction 6 on optionally grounded feeder $L_1$.

The unidirectional potential existing across terminals 25 and 30, in the apparatus just described, is two times the crest value of the alternating current supplied across feeders $L_1$ and $L_2$ at no load, and serves as the input to an oscillator tube generally designated 35, which may be a three-element tube, but is preferably a multiple grid tube or a five-element tube such as that illustrated.

In a preferred form of the invention illustrated in Figure 1, the oscillator tube 35 is provided with a cathode 36 which is indirectly heated by heater 37; the tube also has a control grid 38, a screen grid 39, and a suppressor grid 40. The tube also includes an anode 41. At 45 there is illustrated a transformer having a primary winding 46, a high voltage secondary winding 47, a low voltage secondary winding 48. An iron core 49, which may be an open or closed iron core made of thin transformer core stock is used when the frequency is within the range suitable for such use, as heretofore mentioned. Otherwise the core is air. At 50 there is illustrated a half-wave rectifier tube having cathode 51 which is indirectly heated by heater 52 and which also has an anode 53.

The filaments of tubes 11, 35 and 50 are energized in any suitable manner, preferably by connecting in series, through a circuit extending from $L_1$, through heater 52, connection 42, through heater 37, line 34, heaters 14 and 15, line 19 and resistance 24 to junction 9 on $L_2$. Where tubes of standard manufacture are used, the resistance 24 is preferably included for adjusting the current to an amount suitable for the filaments, but where tubes of especial filament voltage are manufactured, the resistor 24 may be omitted.

The circuit connections between oscillator tube 35, transformer 45, and rectifier 50 are as follows: From junction 6 on feeder $L_1$, a circuit extends over line 43 to junction 44 on line 29, and thence to the screen grid 39 of the tube 35. From junction 30, line 32 extends to the cathode 51 of rectifier 50, and from junction 33 on line 32 circuit 54 extends to cathode 36 and suppressor grid 40 of oscillator tube 35. From junction 33 there also extends a circuit through line 54 to junction 55 and thence through the regulating resistance 56 and condenser 57, in parallel, to terminal 60, which serves as one of the output terminals of the apparatus to which output line 61 is connected.

Terminal 59 is connected to line 32 (or junction 30 or 33) and serves as another one of the output terminals of the apparatus. One end of the transformer secondary winding 48 is likewise connected to terminals 60, the other end of winding 48 being connected through line 62 and through grid bias resistor 64 and grid bias condenser 65, in parallel, to the control grid 38. Terminal 25 is connected through line 67 to one end of primary winding 46 of the transformer 45, the other terminal of winding 46 being connected through line 68 to anode 41 of the oscillator tube 35. If desired, an adjustable condenser 69 may be connected across the primary winding 46 as shown in Figure 1a to control the frequency of oscillation of oscillator tube 35, but in many instances this is unnecessary because of the inherent capacitance of the circuits provides all the capacitive reactance needed for the oscillating circuit of tube 35. Anode 53 of the rectifier 50 is connected by line 71 to tap 72 on the high voltage secondary winding 47 of the transformer 45, tap 72 being preferably made adjustable. Terminal 73 of the high voltage secondary winding 47 serves as one of the output terminals of the apparatus, output line 75 being connected thereto. Tap 76 on secondary winding 47, also preferably adjustable, serves likewise as an output terminal of the apparatus to which output line 78 is connected.

In the apparatus of Figure 1 the winding 48 may be disconnected from terminal 60 and connected via line 48' to line 32. When this is done terminal 60 is connected via line 43' to the intermediate voltage tap 44. This type of connection is shown in Figure 1a.

Figure 11A:
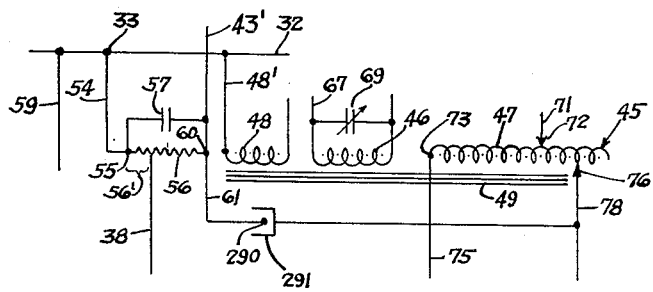

If a device having a corona discharge function is connected between terminals 61 and 78, as illustrated at 290—291 in Figures 11 and 11a, and elsewhere in the drawings, then a very closely controlled output voltage is obtainable, that has a number of advantages over the usual unregulated or indifferently regulated high voltage supply. The corona discharge element 290—291 may be simply an element in the load device, or it may be a separate corona discharge element that is used simply for its regulating function. As a result the power supply has many useful applications. The apparatus of the present invention has particular advantages as a power supply for dust precipitation apparatus where corona discharge of limited amount is utilized for ionizing the dust prior to precipitation. The control function of this power supply is described hereinafter.

The first control function is that the power supply delivers a voltage output that is nearly independent of variations in the supply line voltage, over a wide range of line voltage variations.

In any corona discharge, there is practically no flow of corona current for voltages below a certain minimum value which is determined by the shape and configuration of the corona discharge surface, the gas surrounding the surface, the conditions of pressure, temperature and the presence of any types of radiation that might produce ionization. At this certain minimum voltage, current in the form of corona discharge will begin to flow and for each small increment of voltage increase, the increase in corona current will be large. In other words, up to this certain minimum voltage (hereinafter referred to as the minimum ionizing voltage), the corona discharge device presented an almost infinite resistance, but when the minimum ionizing voltage is reached the resistance drops from this almost infinite value and continues to drop rapidly for each succeeding increment of voltage increase. Accordingly, when a corona discharge device is connected between terminals 61 and 78 and the tap 76 is adjusted until the voltage between 61 and 78 is just slightly above the minimum ionizing voltage, then small changes in output voltage will produce unexpectedly large changes in the output current that flows between terminals 61 and 78. Hence, if the power supply is adjusted so that ionization in the corona discharge device has just begun or is about to begin and the line voltage applied between terminals $L_1$ and $L_2$ is increased, a corresponding variation of nearly equal proportions takes place in the voltage output of the voltage doubler and tends to produce a corresponding proportional variation in the voltage output of the oscillator tube 35. This tends to increase the voltage output of the high voltage transformer 45, and thus the voltage applied to the corona discharge device. A given percentage increase in voltage across the corona discharge device produces a much greater percentage variation in the corona current and this change in corona current produces a change in voltage drop in the control resistor 56. Control resistor 56 is connected in such a manner that an increase in ionizing current flow produces an increased negative bias on the oscillator tube 35, thus tending to reduce the output voltage of the oscillator tube 35. Thus an increase in line voltage while tending to increase the voltage output between terminals 61 and 78 (and also 61 to 75, 75 to 78 and 59 to 75 or 78) has also a control exercised by virtue of the corona discharge device and its effect upon the oscillator tube 35 so that for a given percent variation in line voltage the actual variation in output voltage can be held to a very small fraction of that percentage.

Likewise, voltage changes that are due to changes in the efficiencies of the voltage doubler, oscillator, output transformer, or rectifier will also to some extent be compensated by the control exercised by the corona discharge device 290—291, regulating resistor 56 and the condenser 57.

Some control of output voltage is provided even if the loads across 61 and 75 or 78 or across 59 and 75 or 78 are constant resistance loads. However, the control is very much more effective if one of the loads is a corona discharge device operating at a voltage a little above its minimum ionizing voltage.

The second control function that the power supply provides is a control over the current supplied from terminals 61 and 75 and from terminals 61 and 78. This control function may be described as follows: It may be assumed that a corona discharge device is connected between terminals 61 and 78 and a more nearly constant resistance load is connected between terminals 61 and 75. An exemplary installation of this type is the modern dust precipitators where the precipitator plates are connected between 61 and 75 and the ionizing surfaces are connected to 61 and 78. If the value of the resistance between terminal 61 and 75 is decreased (as by short circuit in the plates of the precipitator), there will be a tendency for the current into this load to increase. This will increase the current flow in the control resistor 56, and hence will increase the voltage drop across this control resistor 56. This increase in voltage drop across the control resistor 56 gives the oscillator tube an increased negative bias and this tends to reduce the voltage output of the oscillator, which in turn tends to reduce the voltage available at the output terminals 61 and 75. Thus, a decrease in resistance of the load between terminals 61 and 75 has the net effect that the current output will increase somewhat but the ratio of the increased current to the original current will not be as great as the ratio of the original load resistance to the decreased load resistance, which would be true were control not exercised. The system thus produces a controlled current output.

The control functions just described are those that would result if no corona discharge device were connected between terminals 61 and 78. However, if a corona discharge device is also connected between terminals 61 and 78, then the above described control is modified. Thus, where there is a simple decrease in the value of the load resistance between terminals 61 and 75, it was shown that this decrease tends to decrease the output voltage. If a corona device is connected and is in a corona emitting condition, such a decrease in output voltage would produce a relatively big decrease in the current flow through the corona discharge device, and hence a relatively big decrease in the voltage drop in the control resistor 56. Such a decreased drop in the control resistor is supplementary to the tendency first described. The general results of these two tendencies may be summed up as follows: (1) If the corona discharge device is made the dominating element in the circuit then the output voltage will remain reasonably constant in spite of variations in load resistance between terminals 61 and 75. (2) If the control exercised by the load current from terminals 61 and 75 is made the dominant control then the output is substantially a controlled current output. The question as to which of the circuit elements is the dominant one depends on many factors such as the relative value of the current in 61 and 75 compared with the current in 61 and 78, and upon the characteristics of the corona discharge device, such as its configuration, the voltage applied to it, atmospheric conditions, whether the corona discharge device is in a chamber, the conditions of the gas, etc.

Figure 12:
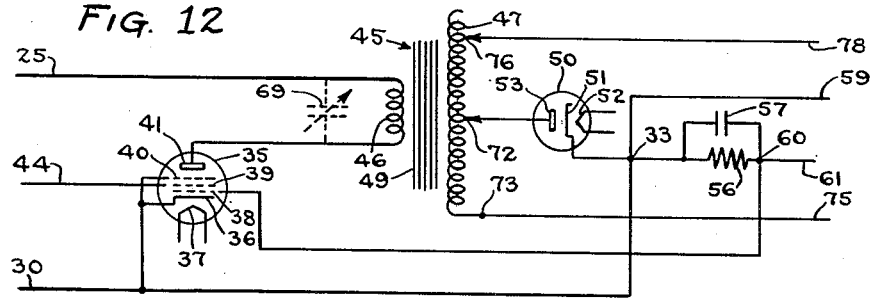

*Figure 12.*—The corona discharge device may be made the only control element by connecting the variable load as shown in Figure 12. In this modification the constant resistance load is connected between terminals 59 and 75, while the corona discharge device is connected between terminals 61 and 78. In this modification transformer winding 48, resistor 64 and condenser 65 are omitted, and grid 38 is connected directly to terminal 60. When the connections are made as shown in Figure 12, the load current from 59 and 75 does not pass through the control resistor 56, and as a result no control is exercised by variations in this load. Hence, the current from 59 to 75 is free to vary as the reciprocal of the resistance of the load, the only limitation being that for a power supply of given design, the current available has a certain maximum as determined by the overall regulation of the unit. The corona discharge device such as 290—291 of Figure 11 would be connected between 61 and 78 (Figure 12) and therefore acts to maintain the terminal voltage between 59 and 75, at a constant value. This arrangement is especially useful where a voltage output is required that does not vary in spite of variations in line voltage or load conditions. The corona discharge device may be kept at constant conditions of pressure, temperature, etc. and for this purpose may be housed in a closed tube, not illustrated.

If the gas surrounding the corona discharge device is allowed to vary in temperature or pressure, then the voltage output is a function of the temperature or gas pressure, and where such relatively slight variations are not disadvantageous, the corona discharge device may be exposed or physically (but not hermetically) enclosed.

There has been described above the various ways in which the current output from terminals 61 and 75 may be controlled, including the extreme case of no control over current when the load is drawn from terminals 59 and 75. There is, in addition to the above types of control, a valuable type of control exercised over the current through the corona discharge device itself. If it is assumed that the corona discharge device is connected between terminals 61 and 78 of Figures 1, 11, or 12, then variations in resistance of the corona discharge device result in control which will tend to keep the current in the corona discharge device constant. The amount of voltage variation required to accomplish this is dependent on the size and configuration of the corona discharge device. By properly selecting or designing the corona discharge device the voltage between terminals 61 and 75 or 59 and 75 can be made to vary in a variety of ways as a function of the atmospheric conditions in the corona discharge device.

From the foregoing discussion, it can be seen that this power supply has several advantages over the usual power supply consisting of a transformer, rectifier and filter.

By connecting apparatus of Figure 1 as shown in Figure 11 with a corona discharge device 290—291 between terminals 61 and 78, and the load connected across lines 59 and 75, the voltage output is relatively independent of both variations in supply line voltage and variations in the resistance of the load. If the corona discharge device 290—291 is contained within a sealed tube so the pressure of the gas within the tube is a function of temperature only, then the power supply can be used to produce an output voltage that is a function of the temperature only. If the corona discharge device 290—291 is in a sealed tube and is held at a constant temperature by a suitable thermostatically controlled heater, not illustrated, then the power supply provides an output that is independent of variations in atmospheric conditions (temperature and pressure), as well as independent of variations in line voltage and load resistance. The arrangement just described is an ideal power supply for a cathode ray oscilloscope.

When the corona discharge device such as 290—291, Figure 11, is open to the atmosphere, the voltage output between terminals 61 and 78 is controlled so that the corona current is relatively constant and as a result the amount of ozone produced by the corona discharge device will remain relatively constant in spite of changes in atmospheric conditions (such as changes in pressure) and in spite of changes in line voltage and at the same time the voltage between 61 and 775 likewise varies as a function of the voltage between 61 and 78. Such an arrangement is ideal for supplying power to a precipitator consisting of an ionizing wire for ionizing dust, bacteria, pollen, etc. and a set of precipitating plates for removing such ionized particles from the air. In such a case the ionizing wire is connected between 61 and 78 and the precipitating plates connected between 61 and 75. The ionizing wire of the precipitating apparatus may be made of slightly larger size than wire 290 so as not to ionize quite as much as 290 for a given voltage. Wire 290 therefore acts as the control wire. Such a precipitator when supplied with power from a power supply such as the one here described would tend to regulate the amount of ozone and nitrogen oxides produced so that the atmosphere produced is safe to breathe regardless of how atmospheric conditions and line voltage vary.

A third advantage of this type of power supply is that it provides certain safety features. In the first place, when loads are connected between terminals 61 and 75 or between 61 and 78, this power supply has a controlled current output, as previously explained. By suitably selecting the sizes of the circuit elements the maximum current output under any conditions can be limited so that it is below a value that would possibly cause injury or death to a person. The power supply likewise provides a smooth unidirectional output without requiring high capacity condensers to filter the output. The reason for this is that when the frequency of the oscillator may be reasonably high, for example in the range of medium audio frequencies to low radio frequencies, and the capacity required at such frequencies to filter the output to a smooth unidirectional output is very small compared with that required for filtering the output of a rectifier operated on conventional low frequency (50–60 cycle) power supply systems. When used with dust precipitation systems the precipitating plates themselves are sufficient to serve as the filter capacity. Since the filtering capacities required for the type of power supply herein described are very small, the energy stored can be within safety limits even with the voltage across the filter condenser at a high value. In addition the type of power supply herein described is safer than conventional types used in precipitator apparatus because the chances of overheating because of poor operating conditions are very slight compared with the conventional type consisting of transformer, rectifier, and filter. For example, the output terminals 61 and 75 or 61 and 78 may be shorted without producing any overheating, due to the control effected by grid 38. A conventional power supply under similar conditions would badly overheat the rectifier tube and the transformer.

Since the degree of regulation provided in the power supply inherently prevents overheating, it can operate under any load conditions without interrupting service by the blowing out of fuses or tripping of overload relays or circuit breakers as is the case with conventional power supply systems when overloaded. In addition the power supply is more convenient to operate because normal operating conditions are restored as soon as normal load conditions are re-established. This fact makes this power supply particularly adaptable to providing power to a precipitating unit wherein the output circuit is subject to hazards of foreign substances shorting the output circuits (ionizing chamber and precipitating plates). When so used, when a short occurs service is immediately re-established when the precipitating plates and the ionizing chamber are cleaned or the short clears itself.

The power supply also offers the advantage that many types of output are available. Between terminals 75 and 78 there is available a high voltage of any desired frequency from high audio frequencies to radio frequencies depending upon the frequency of oscillation of tube 35; this voltage may be controlled in any of the manners previously described. There is available between terminals 61 and 75 and between terminals 61 and 78 an unidirectional high voltage output either pulsating or steady; these voltages may also be controlled in any of the manners previously decribed. Between terminals 59 and 75 or between 59 and 78 there is available unidirectional voltages either pulsating or steady, these voltages again controlled in any of the manners previously described. A combination of unidirectional voltage and intermediate to high frequency voltage is available between terminals 61 and 75 if between terminals 61 and 78 there is connected a capacitive load of sufficient capacity so that the impedance is low to the frequency generated by the oscillator. The relative values of the unidirectional and intermediate to high frequency components may be selected by varying the position of taps 72 and 76. Again these voltages may be controlled by any of the schemes previously outlined.

A further, very material advantage of this type of power supply is the small space occupied by the unit as described later in the text of this application.

In the foregoing descriptions the power supply has been described in which certain valuable results are achieved by controlling the output voltage of a vacuum tube oscillator by controlling the bias voltage of the oscillator tube. All of these valuable results may be obtained by using any of several alternate systems of controlling the output voltage instead of the bias control system just described in detail. Such alternate systems are shown in Figures 1, 12-20. The systems shown in Figures 12-20 all have a number of points in common, which may be described here and then not repeated as each system is described. Each has available a source of direct current suitable for supplying voltage and current to the plate circuit of the oscillator or an amplifier tube. In Figure 1 this is the apparatus under the bracket 10. The positive terminal of this source is designated as 25 and the negative terminal is designated as 30. Another source of direct current of somewhat lower voltage and suitable for supplying voltage and current to a screen grid of an oscillator or amplifier or to the screen grid or plate of some tube requiring less voltage than available between 25 and 30, has its positive terminal designated as 44 and its negative terminal 30 (in common with the plate supply voltage). In each of the alternative systems shown in Figures 12-20, these power supply terminals are shown merely as lines 30, 44 and 25, top to bottom. Each alternate control system has a high voltage output transformer generally designated as 45, suitable for the frequency of oscillations generated. Where the frequencies are suitable for the use of an iron core, one is used as shown at 49. At high frequencies this is omitted. The primary winding is designated as 46 and the high voltage secondary winding as 47. The high voltage winding has a tap labeled 72 which is connected to the anode 53 of the high voltage rectifier 50, which has a cathode 51 heated by heater 52. The cathode 51 is connected to junction 33 which is connected to control resistor 56 with condenser 57 in parallel. Output terminal 59 is connected to junction 33. The other end of control resistor 56 is connected to junction 60. High voltage output line 61 is also connected to junction 60. A variable tap 76 on the high voltage secondary winding furnishes the connection to line 78, another output terminal of the high voltage supply. The end of the high voltage secondary winding designated 73 is connected to line 75, another high voltage output terminal. These elements correspond to correspondingly numbered elements in the device of Figures 1 and 11.

Each of these alternate control systems may be substituted for the grid bias control shown in Figure 1 by disconnecting the apparatus on the right hand side of Figure 1 (i. e. the apparatus under bracket 80) from terminals 25, 44 and 30 and connecting in its place the corresponding lines of the apparatus described by any of the alternate control systems, Figures 12-20. The heaters of the tubes shown in the control system are, as a matter of convenience, not shown as connected to any voltage supply although, of course, a suitable connection must be made so that each tube is supplied with a suitable current along with the tube or tubes, such as voltage doubler tube 11 of Figure 1, included in the direct current supply for plate and screen voltage. In all of the alternate systems the voltage appearing between junctions 33 and 60 is used as the controlling voltage.

*Figure 12.*—In the apparatus of Figure 12 the oscillator tube 35 has its anode 41 connected to one end of the transformer primary 46, the other end of 46 being connected to positive supply line 25. The plate circuit may include a condenser 69 in parallel with 46 for tuning or this may be omitted where the capacitance of winding 46 suffices. The control voltage appearing across the resistor 56 is placed in the control grid circuit by connecting 33 to the cathode 36 and 60 to the control grid 38. The screen grid 39 is connected to the intermediate positive voltage supply line 44. The suppressor grid 40 is connected to the cathode 36. This system oscillates by virtue of the feed back obtained through the capacitance of the high voltage transformer. The output is controlled by the grid 38 becoming more negative on increased output, and less negative on decreased output.

Figure 13:
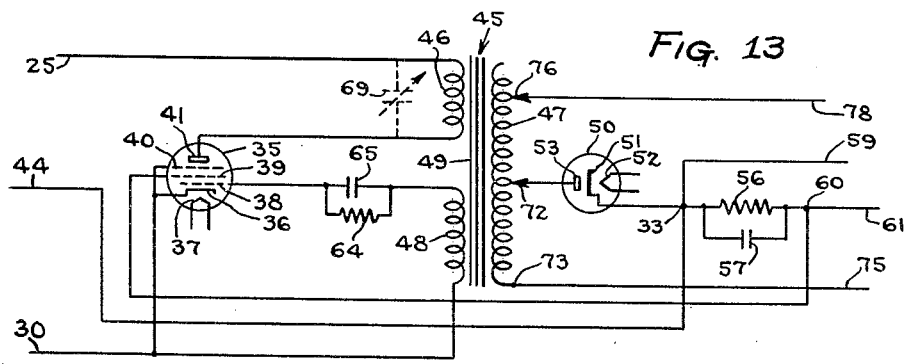

*Figure 13.*—In this modification oscillator tube 35 has its anode 41 connected to the primary 46, the other end of the primary being connected to 25. The control voltage across resistor 56 is placed in the screen grid circuit by connecting junction 60 to the screen grid 39 and junction 33 to line 44. The cathode 36 is connected to 30. The control grid 38 is connected to grid leak 64 and grid leak condenser 65 in parallel, the other end of 64 being then connected to one end of a low voltage secondary winding 48 of transformer 45. The other end of winding 48 is connected to negative line 30. The suppressor grid 40 is connected to the cathode 36. In Figure 13 there is illustrated an inductive feed back oscillator wherein control of the output voltage is obtained by varying the potential of the screen grid 39. The higher the output voltage (and load current), the less positive screen grid 39 becomes and the less the output the greater becomes the positive potential of the screen grid 39.

Figure 14:
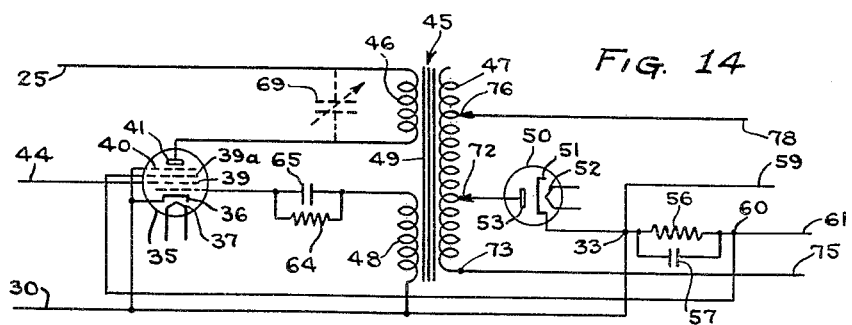

*Figure 14.*—In this system the oscillator tube 35 has its anode 41 connected to 46; the other end of 46 being connected to 25. Variable condenser 69 may be used if desired. The cathode 36 is connected to negative supply line 30 and the suppressor grid 40 is connected to the cathode. The control grid 38 is connected through resistor 64 and condenser 65 in parallel, and thence a low voltage secondary 48 of transformer 45, the other end of 48 being connected to negative supply line 30. The screen grid 39 is connected to 44. This oscillator tube 35 has a fourth grid 39a suitable for controlling the effectiveness of the control grid in producing variations in the plate current. The more negative 39a becomes the smaller is the variation of the plate current for a given variation in the control grid potential. Also, the less negative 39a is made, the greater is the variation of plate current produced by a given variation of the control grid potential. The control voltage across resistor 56 is connected into this fourth grid 39a circuit by connecting junction 33 to the cathode 36 (negative line 30) and by connecting junction 60 to the fourth grid 39a. As the voltage and load circuit increases grid 39a becomes more negative and visa versa, thereby effecting output control.

Figure 15:
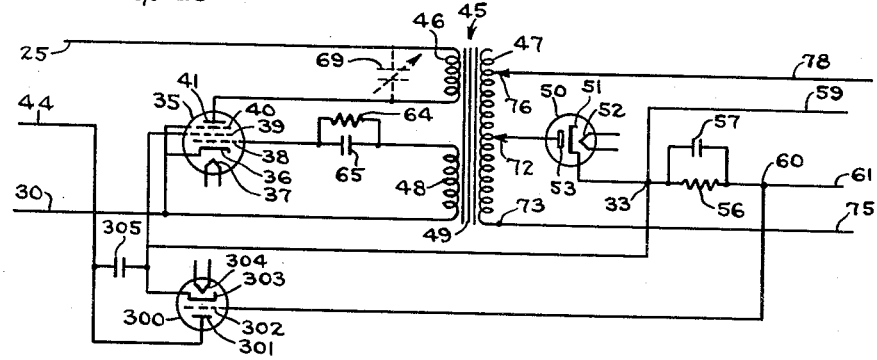

*Figure 15.*—This circuit is identical with that shown in Figure 13 except that the variable screen voltage is not obtained directly from the voltage across the control resistor 56 but as an amplification of this control resistor voltage. To accomplish this, junction 33 is connected to the cathode 303 of a high mu amplifier tube 300, and junction 60 is connected to the grid 302. The cathode 303 is also connected to the screen grid 39 of tube 35. The anode 301 is connected to intermediate positive line 44 and a filter condenser 305 is connected between cathode 303 and anode 301. Increased voltage output of the power supply system results in increased current flow in resistor 56. The resultant increased potential drop across resistor 56 results in grid 302 becoming more negative and this results in increased resistance between cathode 303 and anode 301, thus providing a lower positive potential for the screen grid 39 and hence lower output voltage from oscillator tube 35. Thus a control over output is exercised.

Figure 16:
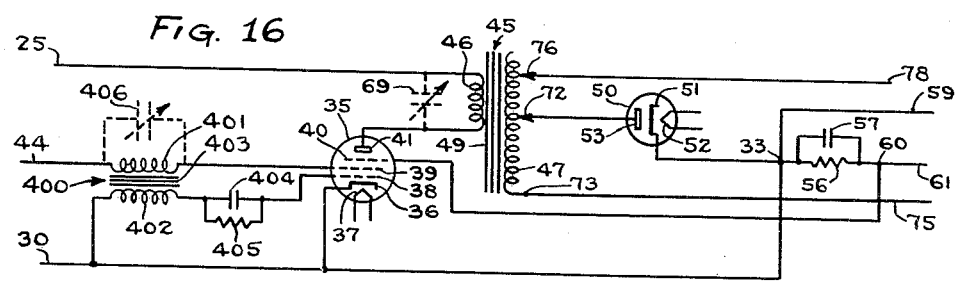

*Figure 16.*—In this modification an oscillating system is formed by the cathode 36, the control grid 38 and the screen grid 39 of pentode 35. These three elements form part of an oscillating circuit by virtue of the fact that the grid circuit is coupled to the screen grid circuit through transformer 400. The control grid 38 is connected through the grid condenser 404 and grid leak 405 in parallel, and thence through coil 402 of transformer 400 to negative line 30. The screen grid 39 is connected through coil 401 to the intermediate voltage supply line 44. Coils 401 and 402 are inductively coupled as indicated in Figure 16 and form a transformer generally designated as 400 which may include an iron core 403 in the event the frequency of oscillation of tube 35 is suitable for such a core, otherwise an air core transformer is used. A capacitance 406, as indicated by the dotted lines, may be used if needed. The oscillating current flowing from cathode 36 to screen grid 39 induces an oscillating current of the same frequency in the anode circuit of the pentode 35, if the plate circuit is tuned so as to have approximately the same resonant frequency. The plate circuit is formed by connecting the anode 41 through the coil 46 to the terminal 25. The amplitude of the alternating current in coil 46 may be regulated by adjusting the potential of the third grid 40. This system is arranged so that as the output current through resistor 56 increases, the third grid 40 becomes more negative with respect to the cathode 36. This is accomplished by connecting grid 40 to junction 60 and cathode 36 to junction 33.

Figure 17:
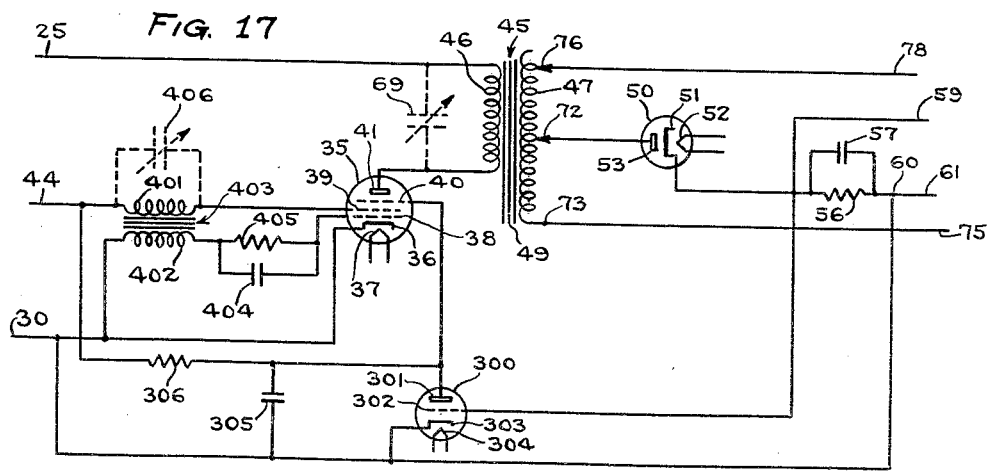

*Figure 17.*—This system is the same as the system described in Figure 16 except that in Figure 17 the third grid 40 is positive with respect to the cathode 36 and control of the output voltage is obtained by making the grid 40 more or less positive with respect to cathode 36. This is accomplished by amplifying the control voltage appearing across resistor 56 before this voltage is impressed on grid 40. To accomplish this, junction 33 is connected to grid 302 of amplifier tube 300 and junction 60 is connected to cathode 303. Anode 301 is connected to the third grid 40 of pentode 35. The intermediate positive voltage supply line 44 of the plate supply is connected through dropping resistor 306 to anode 301 and negative line 30 is connected to cathode 303. A filter condenser 305 is connected between anode 301 and cathode 303. To illustrate how this control functions, assume that pentode 35 is oscillating and that an output is being supplied to loads between 61 and 78 and 61 and 75. This produces a drop in resistor 56 which establishes the grid potential for amplifier tube 300, which in turn establishes the resistance between anode 301 and cathode 303. Thus, the potential of grid 40 with respect to cathode 36 is determined by the current flowing from 44 through 306 and the amplifier tube 300. Now, if it is assumed that the load current in 56 increases, then grid 302 becomes more positive with respect to 303. This decreases the resistance between 301 and 303, which in turn allows more current to flow from 44 through 306 and amplifier tube 300. Hence the potential drop across resistor 306 is greater and the drop across tube 300 less. Thus, as the output increases the control system functions to make 40 less positive with respect to 36 and hence decreases the output of the oscillator tube 35. Conversely, a decrease in output current flowing in resistor 56 produces an increase in the output of oscillator tube 35.

*Figure 18.*—This system is the same as that shown by Figure 16 except that the controlled output of oscillator 35 is amplified before being supplied to the primary 46 of the output transformer 45. The output of the oscillator 35 is applied to the primary 309 of an intermediate transformer 306, whose secondary 308 is tuned by condenser 310. The voltage across the secondary 308 is applied to the grid circuit of amplifier tube 300 by connecting one terminal of 308 to cathode 303 and the other terminal to grid 302. When using a screen grid amplifier as shown, the screen grid is connected to a positive source of supply 44a of the plate supply system, whose voltage is at some suitable point between the values of the voltages available at terminals 44 and 25. This voltage, 44a, may be used to supply plate current to the oscillator tube 35 as shown. The plate circuit of the amplifier 300 is completed by connecting the plate supply terminal 25 to one terminal of the high voltage output transformer primary 46 and the other terminal of the primary 46 to the anode 301 of amplifier 300. The cathode 303 is connected to negative supply line 30. A condenser 69 is used, if needed, to tune the primary winding 46. This system is suitable for handling larger amounts of output power, than any of those systems previously described. An extra choke coil 311 and a filter condenser 312 are connected so as to maintain the screen grid voltage of 300 very stable and thus eliminate any possibility of 300 oscillating at some frequency of its own rather than simply amplifying the output of oscillator 35.

*Figure 19.*—This system is somewhat similar to that shown in Figure 18 in that electron tube 35 is a triode arranged to operate as a self excited oscillator. The grid circuit includes a grid condenser 65 and a grid leak resistor 64 in parallel, and also a secondary winding 308A on transformer 306. The cathode 36 is connected to the negative plate supply line 30. The plate circuit of 35 is formed by connecting the anode 41 to one terminal of primary winding 309 on transformer 306, the other terminal of 309 being connected to the positive plate supply line 44. The output of this self excited oscillator 35 thus showing in primary winding 309 induces a corresponding voltage in the secondary winding 308. Secondary 308 is tuned by the condenser 310. One terminal of secondary winding 308 is connected to control grid 302 of amplifier 300 and the other is connected to the anode of 501 of a control tube 500. The cathode 503 of tube 500 is connected to the negative supply line 30. The result of these connections is that the grid 302 of amplifier 300 has applied to it an alternating current voltage of constant amplitude from the oscillator tube 35 and an unidirectional potential equal to the voltage drop between anode 501 and cathode 503 of control tube 500. The screen grid 305 of 300 is held at constant potential by virtue of the connection to positive plate line 44 through a filter consisting of the series inductance 311 and the shunt condenser 312. The plate circuit of tube 300 is formed by connecting anode 301 to one terminal of primary winding 46 of the high voltage output transformer 45, the other terminal of winding 46 being connected to the positive supply line 25. The plate circuits of control tube 500 are completed by connecting its anode 501 through the dropping resistor 505 to the intermediate positive supply line 44. The grid circuit of control tube 500 is completed by connecting grid 502 to junction 33 of the output control resistor 56, the other terminal 60 of resistor 56 being connected to the cathode 503 of tube 500, and to the negative supply line 30. The control system functions as follows: An increased output current in lines 61 and 75 or 61 and 78 results in increased current flow in 56 and hence in an increased positive potential being applied to grid 502 of control tube 500. This results in an increase in the plate current flowing from 501 to 503 and hence in an increased drop in resistor 505. Since the voltage between supply lines 44 and 30 is constant, this increased drop in 505 has the effect of lowering the voltage across 501 and 503. Since 501 and 503 are in series with the grid circuit of 300 and are connected as shown, this change has the effect of decreasing the positive potential of grid 302. If tube 300 has been selected so that very little plate current flows at zero grid voltage but increases rapidly as 302 becomes positive, then a small drop in positive potential of 302 will substantially reduce alternating current output of amplifier tube 300. In other words, tube 300 performs as a class C amplifier whose output is modulated by grid bias, the grid bias in this case being the control voltage from resistor 56.

*Figure 20.*—This control system may be described generally as follows: It consists of a self-excited oscillator 35, the amplitude of its oscillations being controlled by the plate voltage. The output of this oscillator is fed to a power amplifier whose output is then fed to the high voltage output transformer 45. The plate voltage applied to tube 35 is controlled so that as the load drawn through output control resistor 56 increases, the increased drop in this resistor makes the grid 502 of the auxiliary amplifier tube 500 become more positive; this allows more current to flow from anode 501 to cathode 503, thus increasing the voltage drop in resistor 505, and thus reducing the plate voltage to tube 35.

The result is that increased load current tends to reduce the voltage output of oscillator tube 35 and conversely decreased load current tends to increase the oscillator tube voltage output.

In many respects the circuit of Figure 20 is very similar to that of Figure 19. In Figure 20 the self-excited oscillator is the same as in Figure 19 except that its plate supply is variable, the plate circuit being completed by connection to one terminal of the plate winding 309, the opposite terminal of the winding 309 being connected to the dropping resistor 505. Resistor 505 is connected to the plate supply line 25. The junction of 505 and 309 is also connected to the anode 501 of auxiliary tube 500, the cathode 503 of which is connected to the negative supply line 30. A capacitor 506 is connected between anode 501 and cathode 503, so that the plate potential of 500 will not vary at a high frequency rate but only at a rate sufficient to control the plate voltage on 35 and hence the output of tube 35. The grid circuit of the auxiliary tube 500 is formed by connecting the grid 502 to the control resistor 56 at junction 33, the other end of 56, junction 60, is connected to plate supply terminal 30.

Referring to Figures 2 and 3, there is illustrated a physical embodiment of the power supply system shown in the wiring diagram, Figure 1. It includes a relatively small base generally designated 81, upon which there are mounted the voltage doubler tube 11, oscillator tube 35, rectifier tube 50, a condenser pack generally designated 82 which contains condensers 26 and 27 and the high voltage transformer generally designated 45. For an apparatus having an output of 5 watts at 4,000 to 8,000 volts, the entire apparatus may be contained in a space having outer dimensions of, for example, 3 inches wide, 5 inches long, and 5 inches high, and weighing only about 2 pounds.

Variations in the mode of supplying power for the apparatus from varying sources are illustrated in Figures 4–10. One such variation is shown in Figure 4, the physical embodiment of this being shown in Figures 5 and 6. Another modification is illustrated by the wiring diagram, Figure 7, and physical embodiment of this modification is described by Figures 8 and 9. A third modification is described with reference to the wiring diagram shown in Figure 10. These three modifications are identical with the apparatus described by Figure 1 except that each modification represents a different type of plate power supply. Each of these modifications will provide the same type of output and each has the same general advantages as described for the power supply of Figure 1, the only differences being that the three modifications offer a range of adaptability suitable for varying types of electrical energy sources that may be available for the types of electron tubes used and for the amount of output power desired.

Figure 7:
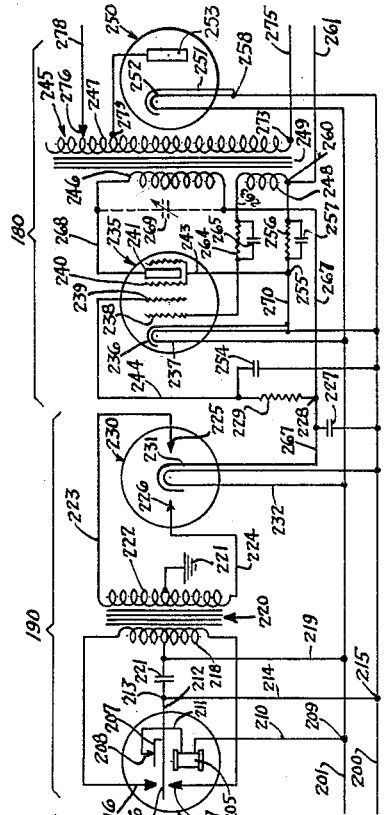
Figure 10:
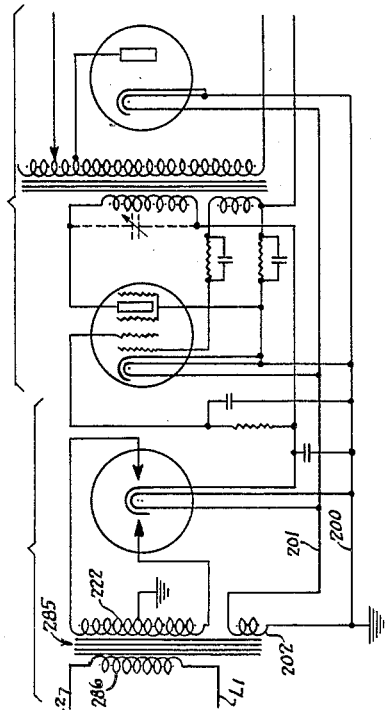

Any one of the types of oscillator controls described in Figures 1, 11 and 12–20 may also be applied to control the output of the invention as described by Figures 4, 7 and 10, the type used being determined largely by the type of tubes used and the amount of power output required.

Referring to Figure 4, there is illustrated a slightly modified form of the invention, wherein the oscillator 35, rectifier 50, and transformer 45 shown under the bracket 80, are identical with correspondingly numbered parts described and illustrated with reference to Figure 1. In Figure 4, however, the direct current supply for the oscillator tube 35, shown under the bracket 90 replaces the apparatus shown under the bracket 10 of Figure 1. Referring to Figure 4, the apparatus under the bracket 90 includes alternating current feeders $L_1$ and $L_2$. At 92 there is illustrated a voltage doubler tube having cathodes 93 and 94, indirectly heated by heaters 95 and 96, anode 97 which cooperates with cathode 93 and an anode 98 which cooperates with cathode 94. A similar, preferably identical voltage doubler tube, is illustrated at 100 and includes cathodes 101 and 102, which are indirectly heated by heaters 103 and 104. Cathode 101 cooperates with an anode 105 and cathode 102 cooperates with an anode 106. Feeder $L_1$ is connected directly to one terminal of a condenser 108 and thence through line 109 to one terminal of a condenser 112, thence through line 113 directly to anode 106 of tube 100. Cathode 101 is connected to junction 114 on line 113. Anode 98 of tube 92 is connected through line 99 directly to junction 110 on line 102, cathode 93 being connected to junction 111 on line 99. Anode 97 is connected through line 115 to junction 116 on feeder L₂. Line L₂ is connected directly to one terminal of condenser 117, the other terminal of the condenser being connected through line 118 to one terminal of condenser 120, the opposite terminal of condenser 120 being connected through line 121 to junction 125 which serves as one of the output terminals of the direct current voltage supply for oscillator tube 35. Cathode 102 of tube 100 is likewise connected directly to terminal 125.

From junction 119 on line 118 a circuit extends through line 122 to cathode 94 of tube 92 and from junction 123 on line 122 a circuit extends through line 124 to grid 39 of oscillator tube 35. Anode 105 of tube 100 is connected directly to junction 126 on line 124.

Terminal 125 thus corresponds in function to terminal 25 of the apparatus illustrated in Figure 1. Junction 130 on feeder L₂ serves as one of the output terminals and corresponds in function to terminal 30 of the apparatus shown in Figure 1.

From junction 130, line 32 extends to junction 33 and thence through line 43 to the cathode 36 and grid 40 of the oscillator tube 35. The heater connection through tubes 92, 100, 35, and 50 in Figure 4, is similar to that shown in Figure 1, except that cathode 51 of tube 50 is connected to heater 52 at junction 58. Thus the heater circuit extends from junction 83 on feeder L₁ through line 84, through heaters 95 and 96 in series, line 85, heaters 103 and 104 in series, line 34, heater 37, line 42, heater 52 and line 87 to junction 33 and thence through line 32 to junction 130 on feeder L₂.

Oscillator tube 35 includes cathode 36 indirectly heated by heater 37, grids 38, 39 and 40 and anode 41. The half-wave rectifier tube 50 includes cathode 51 which is indirectly heated by heater 52 and an anode 53. The transformer generally designated 45 includes a primary 46, a relatively high voltage secondary 47, a low voltage secondary 48 and an iron core 49. Junction 33 on line 32 is connected by line 54 to junction 55 and thence through voltage-regulating resistor 56 and condenser 57, in parallel, to terminal 60 which serves, as in Figure 1, as a common output terminal to which the common output line 61 is attached. Another output line 59 is connected to junction 55. One end of the winding 48 is attached to terminal 60, the other end being connected through line 62 and through grid bias resistor 64 and grid bias condenser 65, in parallel, to the control grid 38 of the oscillator tube 35. One end of the primary winding 46 is connected through line 67 to terminal 125, the opposite end being connected through line 68 to the anode 41 of the oscillator tube 35. A circuit extends from the anode 53 of the half-wave rectifier 50, through line 71 to tap 72 on the high voltage winding 47. Tap 72 may be permanent or variable as desired. The opposite end of winding 47, represented by terminal 73, serves as one of the high voltage output terminals of the apparatus to which output line 75 is connected. A tap 76 on winding 47, which likewise may be variable or fixed as desired, serves as another high voltage output terminal of the apparatus and to which is connected output line 78.

The apparatus illustrated under the bracket 90 including tubes 92 and 100 with condensers 108, 112, 117 and 120 serves to supply to terminals 125 and 130 a unidirectional voltage of approximately four times the crest value of the alternating current supplied to feeders L₁ and L₂ at no load. This intermediate value unidirectional supply admirably serves as the input to standard oscillator tube 35, which may thus operate efficiently.

A physical embodiment of the apparatus, the wiring diagram of which is illustrated in Figure 4, is shown in Figures 5 and 6. Thus, there is illustrated a base member generally designated 127 upon which there is mounted voltage doubler tubes 92 and 100, the oscillator tube 35, a condenser pack 128, containing the condensers 108, 122, 117 and 120, rectifier tube 50 and a high voltage transformer 45. A typical apparatus of the type illustrated, capable of supplying 10 watts at from 8,000 to 16,000 volts, may be contained within a space 3 inches wide by 7 inches long by 5 inches high.

Figure 8:
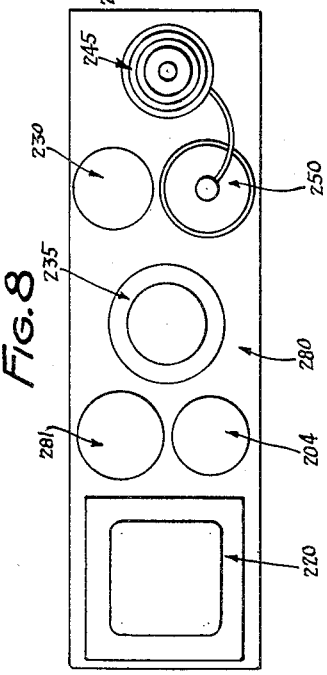
Figures 8 and 9 are, respectively, the plan and side elevational views of the apparatus shown in the wiring diagram, Figure 7.
Figure 9:
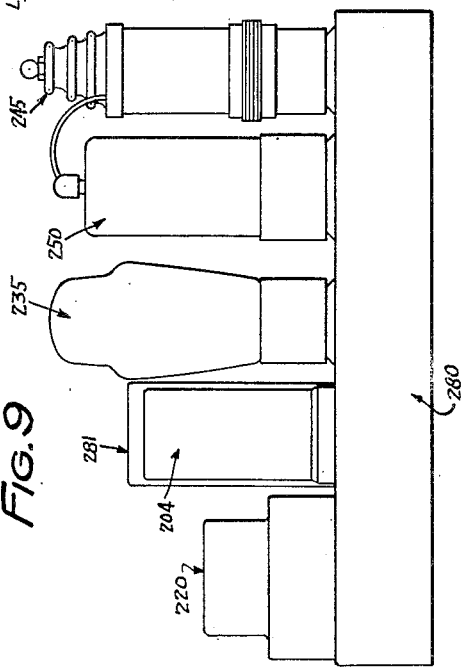

Referring to Figures 7, 8 and 9, there is illustrated a modification of the apparatus of the invention capable of being energized from a low voltage direct current source; for example, a storage battery or similar low voltage source such as might be available in portable automotive or aircraft installations. In the apparatus of Figure 7, the power supply for feeding the oscillator tube is illustrated under the bracket 190, the oscillator tube transformer and rectifier sections being illustrated under the bracket 180.

Low voltage power is supplied to lines 200 and 201. At 204 there is generally illustrated a magnetically operated interrupter of the type customarily used with automobile radio apparatus. This apparatus may be of any approved design and consists generally of a magnet coil 205 which serves to operate the vibrator reed 206, the reed 206 being provided with a contact member 207 which cooperates with contact 208 periodically to energize magnet 205 and thus keep the reed 206 vibrating. The circuit through the magnet 205 is from supply line 201, junction 209, line 210, magnet 205, line 211 to contact 208 and thence through contact 207, line 212, junction 213 and line 214 to junction 215 on supply line 200. Whenever power is supplied to lines 200 or 201, the reed 206 thus vibrates through the circuit intermittently established at the contacts 207 and 208.

The vibration of reed 206 serves to bring it into contact with a pair of opposed contacts 216 and 217, which are connected respectively to opposite terminals of primary winding 218 of the transformer generally designated 220. The midpoint of the transformer winding 218 is connected through condenser 221 to terminal 213, and is connected through line 219 to feeder 201. Junction 213 is connected to reed 206 by line 212 and to feeder 200 by line 214. As the reed 206 vibrates, pulsating direct current is supplied successively to alternate halves of the transformer primary 218 and accordingly there is induced a higher voltage alternating current in the transformer secondary winding 222. The terminals of secondary winding 222 are connected through lines 223 and 224 to the anodes 225 and 226, respectively, of the full-wave rectifier tube generally designated 230, the mid tap of the secondary winding 222 being connected by line 221 to line 200.

The full-wave rectifier tube 230 is provided with a cathode 231 which is indirectly heated by heater 232, the latter being connected across the low voltage supply lines 200 and 201. Cathode 231 is connected to line 267, which is connected through condenser 227 to feeder 200.

At 235 there is illustrated an oscillator tube which corresponds in function to oscillator tube 35 of the apparatus illustrated in Figures 1 and 4. Oscillator tube 235 includes a cathode 236 which is indirectly heated by and connected to heater 237. Heater 237 is connected to supply lines 200 and 201. Tube 235 includes control grid 238, a screen grid 239 and a suppressor grid 240 and anode 241.

At 245 there is generally designated a transformer which corresponds in function to the transformer 45 of the apparatus illustrated in Figures 1 and 4. The transformer 245 includes a primary winding 246, a high voltage secondary winding 247, a low voltage secondary winding 248 and an iron core 249 which is preferably of high grade thin transformer stock, the core of iron being an incomplete magnetic circuit.

At 250 there is illustrated a half-wave rectifier tube having a cathode 251 which is indirectly heated by heater 252, the latter being connected directly across supply lines 200 and 201. The cathode 251 is connected to supply line 200 as indicated at 258 and in this respect corresponds to the apparatus shown in Figure 4.

The connections of the oscillator tube 235, transformer 245, and rectifier 250 are as follows: From junction 228 a circuit extends through dropping resistor 229 and through line 244 to grid 239 of tube 235, the condenser 254 being connected between line 244 and line 200. Line 267 runs from the cathode 231 of the rectifier tube 230 to one terminal of the primary winding 246 of transformer 245, the other terminal of the transformer winding being connected by line 268 to the anode 241 of the oscillator tube 235. A variable condenser 269 may be connected across the terminals of the transformer primary winding 246, as desired, for regulating the rate of oscillation of the oscillator tube 235, but in many instances the condenser 269 may be omitted since the inherent capacitance of the circuits is sufficient to sustain oscillation at a suitable frequency. One terminal of the low voltage transformer secondary winding 248 is connected at junction 260 to the output line 261 and is also connected through voltage regulating resistor 256 and voltage regulating condenser 257, in parallel, to junction 255 and thence through line 270 to the cathode 236 of the oscillator tube. From junction 255 a connection 243 extends to the suppressor grid 240 of the oscillator tube. The opposite terminal of the low voltage secondary winding 248 is connected through line 263 and through the grid bias resistor 264 with grid bias condenser 265 in parallel to the control grid 238 of the oscillator tube. The high voltage secondary winding 247 of the transformer has an output terminal 273 connected to the output line 275 and another optionally variable output terminal 276 connected to the output line 278. A third terminal 279 is connected to the anode 253 of the rectifier tube 250. Another output line 259 is connected to supply line 200.

The voltage output of the full-wave rectifier 230 is supplied to the oscillator tube 245 and, as explained with reference to the apparatus shown in Figures 1 and 4, the oscillator tube 235 oscillates at a rate as indicated with reference to Figure 1, and so feeds the primary 246 of the iron or air core transformer 245, the construction of which depends upon the selected frequency of operation.

In Figures 8 and 9 there is illustrated a physical embodiment of the type of apparatus shown in Figure 7. In this apparatus there is illustrated a base generally designated 280 upon which there is mounted transformer 220, a receptacle container for vibrating reed 204, a can 281 containing the several condensers used in the apparatus, oscillator tube 235, rectifier 230, rectifier 250, and transformer 245. For an apparatus having a capacity of 30–40 watts output at 8,000–20,000 volts, the apparatus can be contained in a space from 2–3 inches wide, 7–8 inches long and 5–7 inches high.

The apparatus illustrated in Figure 10 is a modification adapted to be energized from a low or intermediate voltage alternating current supply and includes transformer 285 having a primary winding 286 which is adapted to be connected to the low voltage alternating current supply lines $L_1$ and $L_2$. The transformer has a secondary 222, which corresponds to the secondary 222 of the apparatus shown in Figure 7, and a low voltage secondary 202 which is connected to the feeders 281 and 290. Otherwise the apparatus of Figure 10 is identical with that shown in Figure 7. The physical embodiment of the apparatus is approximately the same as that shown in Figure 9, except that the can 204 containing the vibrating reed is omitted and the apparatus may, therefore, be slightly rearranged so as to shorten the base.

As many apparently widely different embodiments of this invention may be made without departing from the spirit and scope thereof, it is to be understood that I do not limit myself to the specific embodiments herein except as defined by the appended claims.

What I claim is:

1. A high voltage relatively low wattage power supply for precipitators, cathode ray oscilloscopes, X-ray machines and the like, adapted to be energized from a relatively low voltage power source, means for providing a direct current supply of intermediate voltage from said low voltage power source, a step-up transformer having a relatively low voltage primary and a high voltage secondary, a grid controlled oscillator tube having its input connected to the direct current supply of intermediate voltage and its output connected to the primary of said transformer, a rectifier connected to the secondary of said transformer, an ionization element connected to the rectifier output and a resistor connected in series with said ionization element and connected to said oscillator tube for varying the degree of oscillation of the tube in accordance with the ionization current flowing through the resistor, said apparatus being further characterized in that said means for providing a direct current of intermediate voltage includes a voltage doubler thermionic element connected to condenser bridge means.

2. A high voltage relatively low wattage power supply for precipitators, cathode ray oscilloscopes, X-ray machines and the like, adapted to be energized from a relatively low voltage power source, means for providing a direct current supply of intermediate voltage from said low voltage power source, a step-up transformer having a relatively low voltage primary and a high voltage secondary, a grid controlled oscillator tube having its input connected to the direct current supply of intermediate voltage and its output connected to the primary of said transformer, a rectifier connected to the secondary of said transformer, an ionization element connected to the rectifier output and a resistor connected in series with said ionization element and connected to said oscillator tube for varying the degree of oscillation of the tube in accordance with the ionization current flowing through the resistor, said apparatus being further characterized in that said means for providing a direct current of intermediate voltage includes four thermionic cathode-anode valves and four storage condensers.

MORRIS NEWMAN.

REFERENCES CITED

The following references are of record in the file of this patent:

UNITED STATES PATENTS

| Number | Name | Date |
|---|---|---|
| 1,979,422 | Tholstrup | Nov. 6, 1934 |
| 2,051,372 | Farnsworth | Aug. 18, 1936 |
| 2,144,237 | Wohlfarth | Jan. 17, 1939 |
| 2,262,044 | Philpott | Nov. 11, 1941 |
| 2,302,876 | Malling | Nov. 24, 1942 |
| 2,306,888 | Knick | Dec. 29, 1942 |
| 2,386,548 | Fogel | Oct. 9, 1945 |
| 2,424,972 | Dubin | Aug. 5, 1947 |
| 2,444,349 | Harrison | June 29, 1948 |